Nov. 8, 1927.

E. P. SCHULTZ 1,648,624

UNIVERSAL JOINT

Filed Jan. 9, 1926

WITNESSES

INVENTOR
Edward P. Schultz
BY
ATTORNEYS

Patented Nov. 8, 1927.

1,648,624

UNITED STATES PATENT OFFICE.

EDWARD P. SCHULTZ, OF BROOKLYN, NEW YORK.

UNIVERSAL JOINT.

Application filed January 9, 1926. Serial No. 80,309.

This invention relates to a universal joint. An object of the invention concerns the provision of a simple and efficient joint especially adapted for use in connection with electric light fixtures.

Another object concerns the provision of a joint which is made of a minimum number of simple, strong, durable parts and can be quickly assembled and disassembled.

A further object concerns the provision of a simple device which can be tightened or loosened quickly to adjust the relative positions of the parts and in which the electric wires contained therein are entirely hidden from view yet, nevertheless, can be readily gotten at when desired without entirely dismantling the device.

The invention is illustrated in the drawings, of which—

Figure 1:
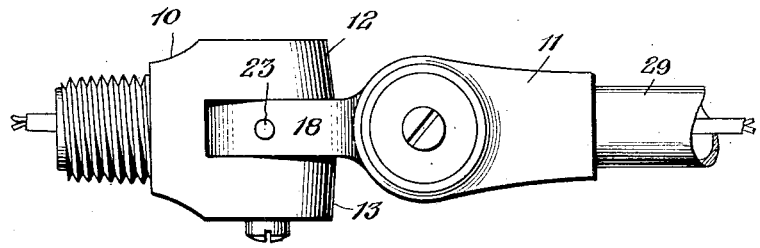
Figure 1 is a side elevation of the device.

The form of the invention shown in the drawings is a preferred form, although it is understood that modifications in the construction and arrangement of the parts and in the character of the materials used may be adopted without departing from the spirit of the invention as set forth in the appended claims.

The invention, in its general aspect, comprises a pair of yoke members having spaced apertured arms. A connecting member extended between the yoke members has apertured end portions which are adapted to be alined between the arms of the yoke members. A friction sleeve is fastened to the end portions of the connecting members and lies within the alined apertures in the connecting member and the spaced arms of the yoke members. The walls of the friction sleeve are tapered and a plate slidable within the friction sleeve is adjustable therewithin and connected to one of the arms of the yoke members to expand the sleeve against the walls of the apertures, so that the connection between the connecting member and each yoke member can be made as tight as desired.

The preferred form of the invention, which is shown in the drawings, comprises two yoke members 10 and 11 each having spaced arms 12 and 13 provided with apertures 14 and 15 therethrough. A connecting member 16 has end portions 17 and 18 the axes of which are perpendicular to each other, and provided with apertures 19 and 20 which are adapted to be alined respectively with the apertures 14 and 15 as shown. A split sleeve 21 is adapted to lie within the alined apertures. The walls of this sleeve are tapered as shown at 22, being thicker at the bottom than at the top when viewed as in Figure 2. This sleeve is connected to the end portion in which it lies by a screw 23. The upper end of the sleeve lies against the shoulder 24 formed in the arm 12 so as to make the inner wall of the sleeve flush with the inner wall of the arm 12 to present a smooth surface. A wire or conductor 25 passes through an aperture 26 in the yoke member 10, through the chamber within the alined apertures, through the gap formed in the split sleeve through apertures 27 in the connecting member 16, then through the gap of the other sleeve into the other chamber formed by the alined apertures and then through a passageway 28 in the other yoke member 11 out through the pipe 29. The flush surface above referred to prevents cutting of the wire should it come in contact with the joint.

Figure 2:
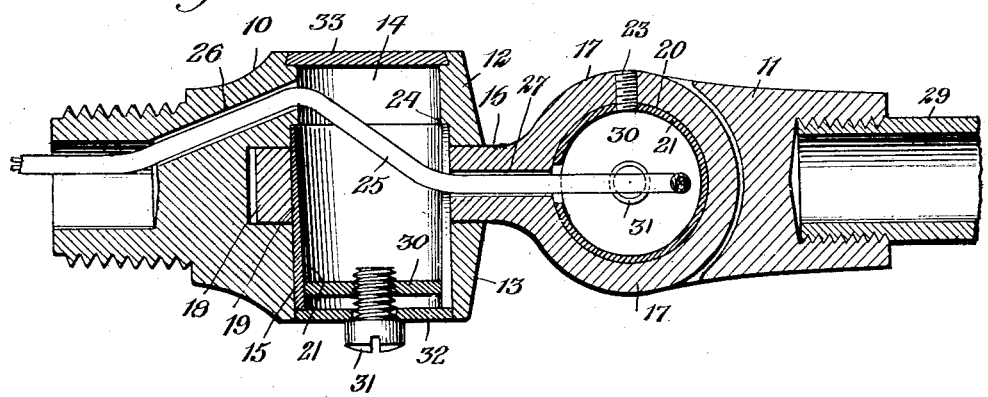
Figure 2 is a longitudinal section through the device.
Figure 3:
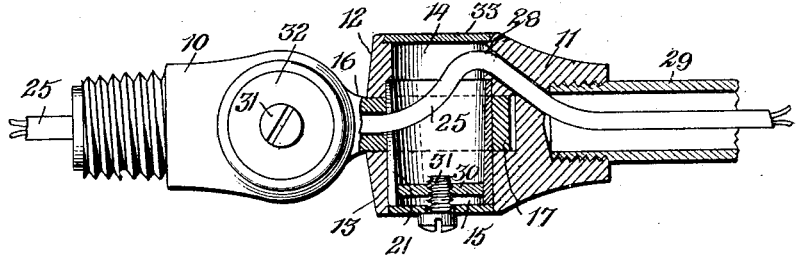
Figure 3 is a longitudinal section through a portion of the device taken at right angles to Figure 2.
Figure 4:
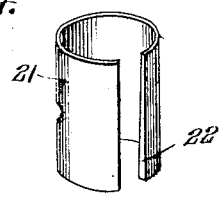
Figure 4 is a perspective view of the clamping or friction sleeve.

A disc 30 is mounted within each sleeve and is adjusted by means of a screw 31 fastened to the yoke members 10 and 11, preferably being mounted on a plate 32 which is detachably removable from the yoke members by pulling the plate down as shown in Figure 2. The slope of the inner walls of the sleeve will cause it to be expanded, whereby it firmly engages the inner walls of the apertures in the arms of the yoke members and apertures in the connecting member. This same action takes place between the connecting member and the other member and can be very finely predetermined. The other end of the chamber can be closed by a plate 33.

This device is simple, efficient, durable, economical to manufacture and is composed of a minimum number of parts which can be readily repaired or replaced.

What I claim is:

1. A universal joint construction which comprises a pair of yoke elements having spaced, apertured arms, the axes of which are at right angles to each other, an apertured connecting member to be disposed between the said arms with its apertures alined with the others, a split friction sleeve disposed within said apertures having a gap between its ends adapted to permit passage of an electrical conductor through the sleeves and connecting member respectively, and means for expanding the sleeve against the walls of the apertures to hold the yoke element and the connecting member together and means for holding said sleeve from rotation.

2. A universal joint construction which comprises a pair of yoke elements having spaced apertured arms, an apertured connecting member disposed between the arms with its apertures in alinement with those of the spaced arms, a split friction sleeve disposed within said alined apertures and having a wall tapered increasingly toward the outer end of said apertures, said sleeve having a gap between its ends to permit passage of an electrical conductor through the sleeve, connecting member and yoke members, a slidable disk fitting within the sleeve and an adjusting member mounted on one of the arms and engaging with the disc to adjust it with respect to the tapered walls of the sleeve whereby the sleeve is expanded against the walls of the apertures and means for holding said sleeve from rotation.

3. A universal joint construction which comprises a yoke member having spaced apertured arms, a conductor passage through one of said arms, a connecting member having an aperture to be alined with the apertures of the spaced arms, a tapered split friction sleeve disposed within the alined apertures the ends of said sleeve defining a gap through which a conductor may pass, a plate mounted on one of said arms, a screw mounted in said plate and projecting into the sleeve and a disc engaged by the screw to be moved within the sleeve to expand the same against the walls of the apertures, the connecting member also having a conductor passage in alinement with the gap of the split sleeve, and means for holding said sleeve from rotation.

EDWARD P. SCHULTZ.